UNITED STATES PATENT OFFICE.

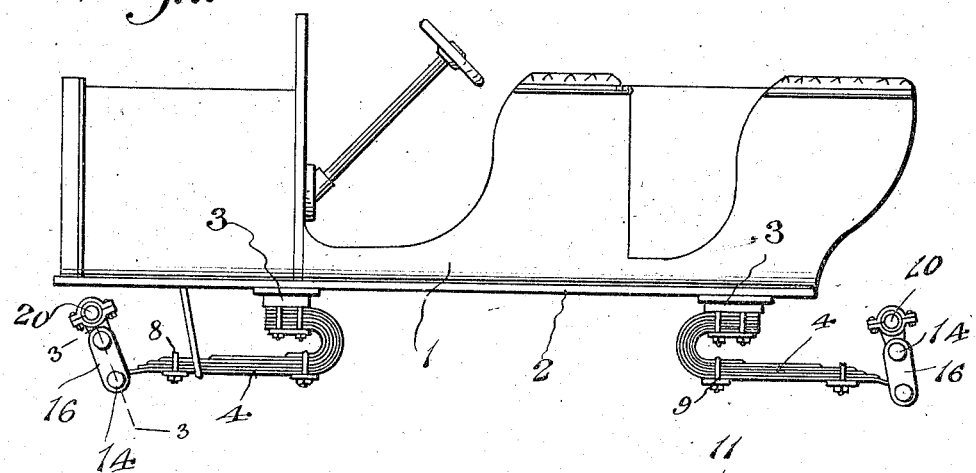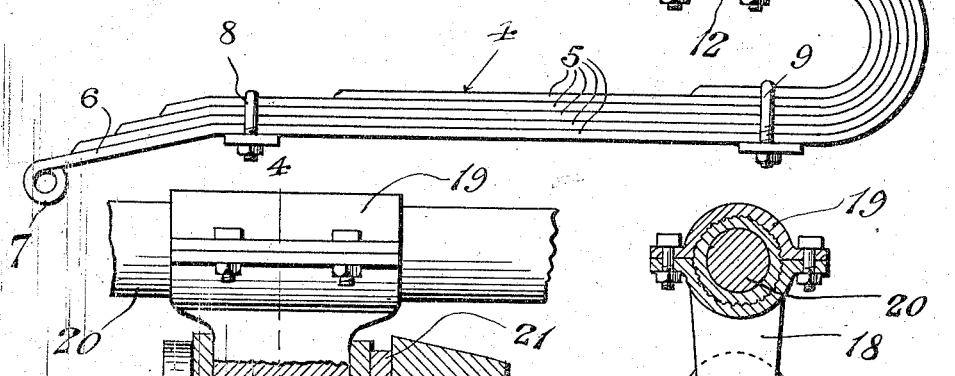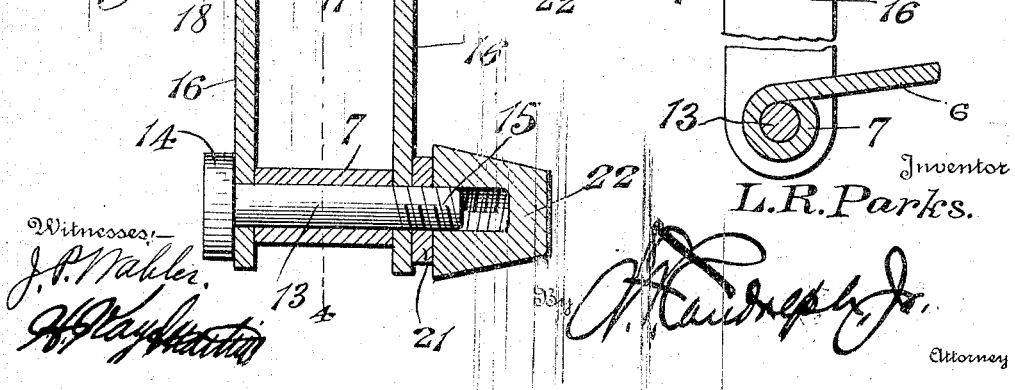

LYTLE R. PARKS, OF AURORA, INDIANA.

VEHICLE-SPRING.

1,184,565.  Specification of Letters Patent.  Patented May 23, 1916.

Application filed October 12, 1914.  Serial No. 866,379.

*To all whom it may concern:*

Be it known that I, LYTLE. R. PARKS, a citizen of the United States, residing at Aurora, in the county of Dearborn and State of Indiana, have invented certain new and useful Improvements in Vehicle-Springs; and I do hereby declare the following to be a full, clear, and exact description of the invention, such as will enable others skilled in the art to which it appertains to make and use the same.

This invention relates to new and useful improvements in vehicle springs and has for its principal object to provide a simple and effective spring which will take up the shock caused by ruts or rough places in the road.

Another object of the invention is to provide a device which will prevent the shock from being transferred to the frame of the vehicle to prevent the same from being weakened and also to make the riding qualities of the vehicle easier.

Another object of the invention is to provide a spring acting on the principle of a lever the fulcrum of which is at the end and the load about one fourth of the way from the fulcrum of the force. This allows the wheels to pass over larger objects without transmitting the force of the jar to the body of the vehicle.

A further object of the invention is to permit of the use of a longer wheel base without materially lengthening the chassis and thereby materially improve the riding qualities of the vehicle.

A still further object of the invention is to provide a spring which will permit the bodies to be nearer the ground, thereby lowering the center of gravity and eliminating much danger of skidding or turning over.

Still another object of the invention is to provide a spring which may be secured to any type of vehicle without materially changing the construction thereof.

With these and other objects in view, the invention consists in the combination and arrangement of parts which will be fully set forth in the following specification and in the accompanying drawing, in which:

Figure 1 is a side view in elevation of a vehicle body illustrating in detail the springs as they would appear when attached thereto. Fig. 2 is an enlarged detail view of the spring. Fig. 3 is an enlarged detail sectional view taken on line 3—3 of Fig. 1 and illustrating the spring suspension in detail. Fig. 4 is a sectional view taken on line 4—4 of Fig. 3.

Referring now to the drawings by characters of reference, the numeral 1 designates the body of the vehicle provided with the usual chassis 2 to which the springs are secured. This chassis is provided with a pair of bearing plates 3 which are secured to the chassis at each end and these plates are arranged to form a connection between the spring and the body. The spring, which is best illustrated in Fig. 2 is designated generally by the numeral 4 and comprises the leaves 5 which are varying in length and the outermost leaf is longer as illustrated. This leaf is extended as at 6 and looped as at 7 to form the connection to the axle of the vehicle. The extension 6 is bent angularly as illustrated and the remaining leaves of the spring terminate at varying intervals between the angular extension and the clamp designated by the numeral 8. This clamp is of the ordinary construction and comprises a U-shaped bolt which is arranged to coöperate with a plate provided with apertures near each end in holding the spring leaves in their operative positions. Similar clamps 9 are provided and the ends of the leaves opposite the inclined end are bent back upon themselves as at 10 so as to form a rearward extension 11 which is held in operative position by means of the clamp 12. This rearward extension lies parallel with the remaining portion of the spring and is arranged to bear against the plate 3 hereinbefore mentioned and be secured thereto.

Extending through the loop 7 is the bolt 13 provided with the usual head 14 and threaded end 15. This bolt is arranged to extend through the links 16, the upper ends of which are pivoted to the bolt 17 which extends through the loop 18, which is formed on the sleeve 19. This sleeve is arranged to surround the axle casing 20 as clearly shown in Figs. 3 and 4.

It is to be understood that when so desired the axle casing and sleeve may be grooved to form teeth which coact in holding the sleeve against rotation and thus prevent any wear on the axle casing. A suitable nut 21 is arranged to be threaded on the end 15 of the bolt and the grease cup 22 forms a cap for the end of the bolt which may be adjusted to keep the spring properly lubricated.

It will be apparent from the foregoing, that in use when the vehicle strikes a rut or rough place in the road the free ends of the spring will be forced upwardly and owing to the peculiar construction of the spring, it will be evident that little or no shock will be transferred to the body of the vehicle. In this way it will be apparent, that by placing the springs toward the ends of the vehicle or toward the center, the wheel base may be lengthened or shortened at the desire of the user and a particularly simple and efficient spring is provided which will prevent the shock of road travel from being transmitted to the body or chassis of the car.

While in the foregoing there has been shown and described the preferred embodiment of this invention, it is to be understood that such changes may be made in the combination and arrangement of parts as will fall within the spirit and scope of the invention as defined in the appended claim.

Having thus described the invention what is claimed as new, is:—

The combination with a vehicle having front and rear axles provided with grooves to form teeth, circular clamping sleeves secured around the axle and provided with teeth on the interior thereof to coöperate with the teeth of the axles to lock the clamping sleeves at various angles on the axles, loops formed on and depending from said sleeves, links pivoted to said sleeves, a bolt journaled in said links, a main leaf spring looped around said bolt and provided with its upper end secured to a body of the vehicle, and a plurality of leaf springs, one of shorter length than the other secured to the main leaf spring and provided with one of their ends terminating in a line with one end of the main leaf spring.

In testimony whereof I affix my signature in presence of two witnesses.

LYTLE R. PARKS.

Witnesses:
MITTIE E. HOLMES,
JOHN L. HOLMES.